(12) United States Patent
Scheffer (10) Patent No.: US 7,974,805 B2
(45) Date of Patent: Jul. 5, 2011

(54) IMAGE SENSOR AND METHOD

(75) Inventor: Danny Scheffer, Hulst (NL)

(73) Assignee: ON Semiconductor Trading, Ltd, Hamilton (BM)

(*) Notice: Subject to any disclaimer, the term of this patent is extended or adjusted under 35 U.S.C. 154(b) by 81 days.

(21) Appl. No.: 12/251,414

(22) Filed: Oct. 14, 2008

(65) Prior Publication Data

US 2010/0094579 A1 Apr. 15, 2010

(51) Int. Cl.
*H04N 9/64* (2006.01)
*G06F 19/00* (2006.01)

(52) U.S. Cl. ........................................ 702/104
(58) Field of Classification Search .................. 702/104; 348/246
See application file for complete search history.

(56) References Cited

U.S. PATENT DOCUMENTS

| | | |
|---|---|---|
| 3,770,968 A | 11/1973 | Hession et al. |
| 3,904,818 A | 9/1975 | Kovac |
| 4,253,120 A | 2/1981 | Levine |
| 4,465,939 A | 8/1984 | Tamura |
| 4,473,836 A | 9/1984 | Chamberlain |
| 4,479,139 A | 10/1984 | Parrish |
| 4,532,551 A | 7/1985 | Kurata et al. |
| 4,565,756 A | 1/1986 | Needs |
| 4,580,103 A | 4/1986 | Tompsett |
| 4,647,975 A | 3/1987 | Alston et al. |
| 4,703,169 A | 10/1987 | Arita |
| 5,146,074 A | 9/1992 | Kawahara et al. |
| 5,153,420 A | 10/1992 | Hack et al. |
| 5,164,832 A | 11/1992 | Halvis et al. |
| 5,258,845 A | 11/1993 | Kyuma et al. |
| 5,283,428 A | 2/1994 | Morishita et al. |
| 5,296,696 A | 3/1994 | Uno |
| 5,321,528 A | 6/1994 | Nakamura |
| 5,329,112 A | 7/1994 | Mihara |
| 5,335,008 A | 8/1994 | Hamaski |
| 5,381,106 A | 1/1995 | Limberg |
| 5,608,204 A | 3/1997 | Hofflinger et al. |
| 5,614,744 A | 3/1997 | Merrill |
| 5,742,047 A | 4/1998 | Buhler et al. |
| 5,841,126 A | 11/1998 | Fossum |
| 5,861,621 A | 1/1999 | Takebe |
| 5,872,596 A | 2/1999 | Yanai |
| 5,933,190 A | 8/1999 | Dierickx |
| 5,953,060 A | 9/1999 | Dierickx |
| 6,011,251 A | 1/2000 | Dierickx et al. |
| 6,091,847 A | 7/2000 | Chiu et al. |
| 6,133,563 A | 10/2000 | Clark et al. |
| 6,172,831 B1 | 1/2001 | Usui |
| 6,177,293 B1 | 1/2001 | Netzer |
| 6,232,626 B1 | 5/2001 | Rhodes |
| 6,233,066 B1 | 5/2001 | Kojima et al. |
| 6,316,760 B1 | 11/2001 | Koyama |

(Continued)

OTHER PUBLICATIONS

USPTO Notice of Allowance for U.S. Appl. No. 11/111,287 dated Aug. 15, 2007; 8 pages.

(Continued)

*Primary Examiner* — Cindy Hien-Dieu Khuu (57) ABSTRACT

Described herein are methods that may improve yield of an image sensor. In one embodiment, a method that may improve yield of an image sensor includes generating output values of control logic associated with an array of light sensitive elements. The method further may include determining if the control logic has one or more faulty output values. The method further may include automatically correcting the one or more faulty output values.

18 Claims, 6 Drawing Sheets

U.S. PATENT DOCUMENTS

| | | | |
|---|---|---|---|
| 6,350,663 | B1 | 2/2002 | Kopley et al. |
| 6,456,326 | B2 | 9/2002 | Fossum et al. |
| 6,459,077 | B1 | 10/2002 | Hynecek |
| 6,480,227 | B1 | 11/2002 | Yoneyama |
| 6,521,926 | B1 | 2/2003 | Sasaki |
| 6,545,303 | B1 | 4/2003 | Scheffer |
| 6,570,618 | B1 | 5/2003 | Hashi |
| 6,608,337 | B2 | 8/2003 | Hynecek |
| 6,683,360 | B1 | 1/2004 | Dierickx |
| 6,686,220 | B2 | 2/2004 | Rhodes et al. |
| 6,690,074 | B1 | 2/2004 | Dierickx |
| 6,728,483 | B1 | 4/2004 | Smart et al. |
| 6,815,791 | B1 | 11/2004 | Dierickx |
| 6,816,625 | B2 | 11/2004 | Lewis et al. |
| 6,838,714 | B2 | 1/2005 | Rhodes et al. |
| 6,859,231 | B1 | 2/2005 | Sumi et al. |
| 6,965,395 | B1 * | 11/2005 | Neter ............................ 348/129 |
| 7,092,628 | B2 | 8/2006 | Lawther et al. |
| 7,106,373 | B1 | 9/2006 | Dierickx |
| 7,106,915 | B2 | 9/2006 | Dierickx |
| 7,151,287 | B1 | 12/2006 | Scheffer et al. |
| 7,199,824 | B2 | 4/2007 | Chang et al. |
| 7,206,012 | B2 | 4/2007 | Cook et al. |
| 7,206,461 | B2 | 4/2007 | Steinberg et al. |
| 7,312,484 | B1 | 12/2007 | Drowley et al. |
| 7,397,944 | B2 * | 7/2008 | Spampinato et al. ......... 382/162 |
| 7,433,512 | B2 | 10/2008 | Van Der Heide |
| 2002/0105579 | A1 * | 8/2002 | Levine et al. ................ 348/187 |
| 2003/0151682 | A1 * | 8/2003 | Kokubo et al. .............. 348/241 |
| 2004/0051798 | A1 * | 3/2004 | Kakarala et al. ............. 348/246 |
| 2006/0239580 | A1 * | 10/2006 | Dierickx ....................... 382/274 |
| 2008/0239112 | A1 * | 10/2008 | Naito ........................... 348/246 |
| 2009/0110324 | A1 * | 4/2009 | Li et al. ........................ 382/275 |
| 2010/0110240 | A1 * | 5/2010 | Thebault et al. ............. 348/246 |

OTHER PUBLICATIONS

USPTO Notice of Allowance for U.S. Appl. No. 09/460,473 dated May 19, 2006; 2 pages.

USPTO Notice of Allowance for U.S. Appl. No. 09/460,473 dated Oct. 6, 2005; 6 pages.

USPTO Notice of Allowance for U.S. Appl. No. 09/460,473 dated Jan. 28, 2005; 4 pages.

USPTO Final Rejection for U.S. Appl. No. 09/460,473 dated Aug. 27, 2004; 8 pages.

USPTO Non-Final Rejection for U.S. Appl. No. 09/460,473 dated Jan. 26, 2004; 8 pages.

USPTO Non-Final Rejection for U.S. Appl. No. 09/460,473 dated Jul. 18, 2003; 8 pages.

USPTO Notice of Allowance for U.S. Appl. No. 09/906,405 dated Apr. 21, 2006; 5 pages.

USPTO Non-Final Rejection for U.S. Appl. No. 09/906,405 dated Dec. 12, 2005; 9 pages.

USPTO Non-Final Rejection for U.S. Appl. No. 09/906,405 dated Jun. 27, 2005; 8 pages.

USPTO Non-Final Rejection for U.S. Appl. No. 09/906,405 dated Nov. 30, 2004; 9 pages.

USPTO Notice of Allowance for U.S. Appl. No. 11/089,737 dated May 5, 2006; 5 pages.

USPTO Notice of Allowance for U.S. Appl. No. 11/350,298 dated Aug. 22, 2007; 4 pages.

USPTO Notice of Allowance for U.S. Appl. No. 11/350,298 dated Jun. 1, 2007; 2 pages.

USPTO Notice of Allowance for U.S. Appl. No. 11/350,298 dated Apr. 26, 2007; 6 pages.

USPTO Non-Final Rejection for U.S. Appl. No. 11/350,298 dated Jan. 8, 2007; 6 pages.

USPTO Notice of Allowance for U.S. Appl. No. 10/752,845 dated Oct. 6, 2006; 4 pages.

USPTO Non-Final Rejection for U.S. Appl. No. 10/752,845 dated Jul. 13, 2006; 4 pages.

USPTO Non-Final Rejection for U.S. Appl. No. 10/752,845 dated Nov. 2, 2005; 9 pages.

USPTO Miscellaneous Action with SSP for U.S. Appl. No. 09/460,630 dated Aug. 16, 2004; 2 pages.

USPTO Notice of Allowance for U.S. Appl. No. 09/460,630 dated Feb. 27, 2004; 6 pages.

USPTO Non-Final Rejection for U.S. Appl. No. 09/460,630 dated Aug. 14, 2003; 6 pages.

USPTO Final Rejection for U.S. Appl. No. 09/460,630 dated Jan. 24, 2003; 9 pages.

USPTO Non-Final Rejection for U.S. Appl. No. 09/460,630 dated Jun. 10, 2002; 5 pages.

USPTO Final Rejection for U.S. Appl. No. 09/460,630 dated Dec. 6, 2001; 6 pages.

USPTO Non-Final Rejection for U.S. Appl. No. 09/460,630 dated May 23, 2001; 7 pages.

USPTO Requirement for Restriction for U.S. Appl. No. 09/460,630 dated Mar. 21, 2001; 4 pages.

USPTO Miscellaneous Action with SSP for U.S. Appl. No. 09/460,630 dated Feb. 1, 2000; 1 page.

* cited by examiner

IMAGE SENSOR AND METHOD

TECHNICAL FIELD

Embodiments of the disclosure generally relate to image sensors.

BACKGROUND

Large area image sensors (e.g., 8" by 8", 16" by 16") have various applications including x-ray applications, mammogram applications, medical applications, and for electron microscope applications. Typically, an x-ray imager may comprise a CMOS (Complementary Metal Oxide Semiconductor) image sensor and a scintillator. The scintillator converts x-rays to visible light, which impinges a photodiode in the image sensor. The image sensor also includes control logic and a readout circuit for reading a pixel of image information from the photodiode. A typical image sensor has photodiodes that form pixel arrays, control logic, and readout circuits to generate an entire image. The image may be displayed on a monitor or printed for viewing purposes.

Typically in large area sensors for x-ray applications, the control logic includes multiple shift registers in the y-direction of the image sensor. These registers are embedded in the pixel arrays to allow side butting of dies each having one or more sensor arrays. Physically separated dies are assembled together to create a large format image sensor. If a single shift register is corrupted with a faulty value, this affects the entire image sensor, which is then corrupt as well.

BRIEF DESCRIPTION OF THE DRAWINGS

The drawings refer to embodiments of the disclosure in which.

DETAILED DESCRIPTION

In the following description, numerous specific details are set forth, such as examples of image sensors, specific signals, pixel blocks, control logic, named components, connections, example dimensions, etc., in order to provide a thorough understanding of the present disclosure. It will be apparent, however, to one of ordinary skill in the art that the present disclosure may be practiced without these specific details. In other instances, well known components or methods have not been described in detail but rather in a block diagram in order to avoid unnecessarily obscuring the present disclosure. The specific details set forth are merely exemplary. The specific details may be varied from and still be within the spirit and scope of the present disclosure.

In general, various methods are described that may improve yield of an image sensor. In one embodiment, a manual method that may improve yield of an image sensor includes providing light to an array of light sensitive elements. The method further may include generating an image based on the light sensitive elements and associated control logic. The method further may include inspecting the image to determine if the control logic has one or more faulty output values. The method further may include disconnecting control lines from control logic that has one or more faulty output values. The method further may include generating another image based on the control logic having no faulty output values. The manual method can be implemented with minimal additional circuitry (e.g., buffer logic) and no additional control lines.

In another embodiment, an automatic method that may improve yield of an image sensor includes providing light to the image sensor. The method further may include generating output values of control logic associated with the image sensor. The method further may include determining if the control logic has one or more faulty output values. The method further may include automatically correcting the one or more faulty output values. The method further may include automatically generating an image based on the control logic having no faulty output values. The automatic method does not have user action or intervention for disconnecting the control logic having faulty output values. The automatic and manual methods both may improve yield for image sensors by having redundant control logic, which is particularly important for large area image sensors that are typically more vulnerable to processing defects and therefore tend to have a lower yield than what is considered to be normal in semiconductor processing.

Figure 1:
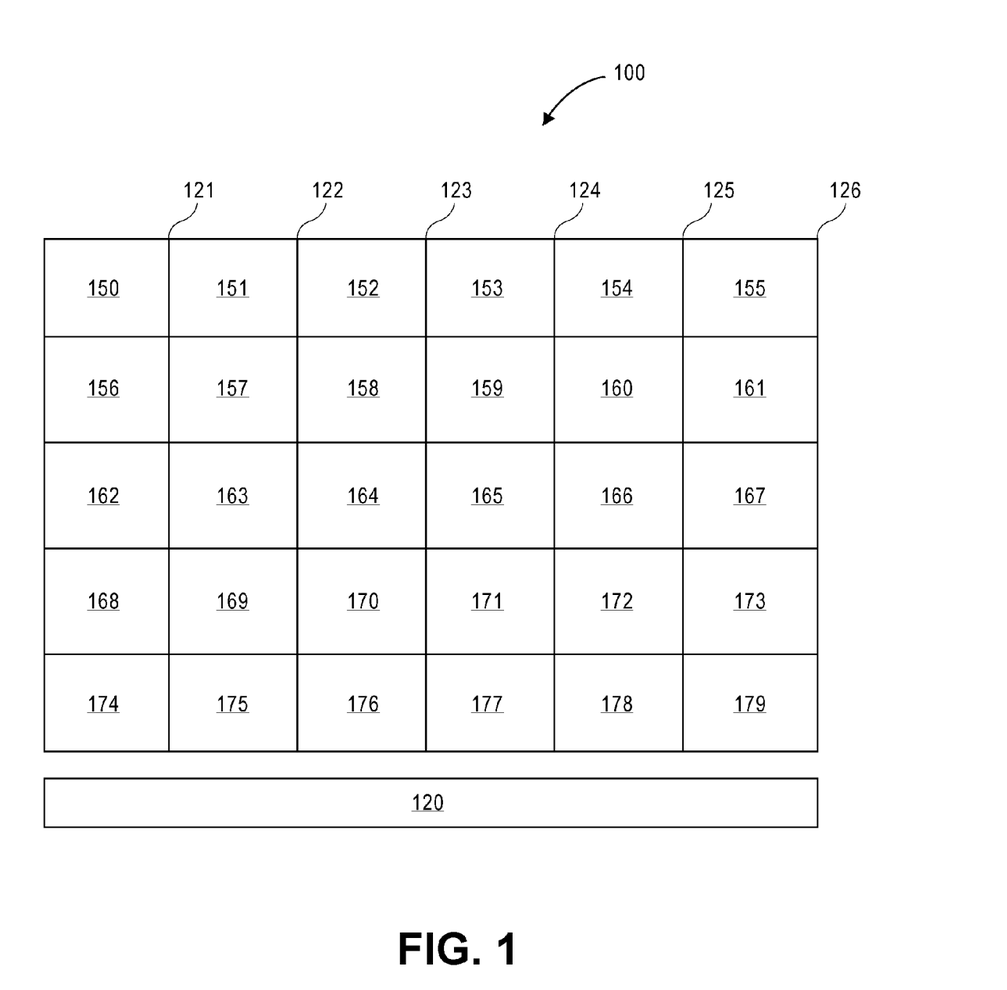
FIG. 1 shows a block diagram of an embodiment of an image sensor.

FIG. 1 shows a block diagram of an embodiment of an image sensor. The image sensor 100 may be an array of elements used for various applications. In one embodiment, the image sensor 100 includes pixel blocks 150-179, sensor read out circuitry 120, and control logic 121-126. Each pixel block includes an array of pixels. The image sensor 100 may be implemented in a CMOS or MOS technology with each pixel being a passive or an active pixel. A passive pixel sensor is a photodiode (MOS or p-n junction diode) with a transistor acting as a switch that passes photo-electrically generated signal charge to an amplifier outside the pixel array. The term "active pixel" refers to any pixel that has an active element integrated in the pixel, that is, at least one amplifier that typically includes one or more transistors to amplify the charge that is collected on the light sensitive element in the pixel.

The sensor read out circuitry 120 is coupled to the pixel blocks. The sensor read out circuitry 120 may include output buses, registers, multiplexers, and addressing switches for reading out pixel values from the pixel blocks. In one embodiment, the control logic includes circuitry or is coupled to circuitry that can manually or automatically disconnect control lines from faulty output values. In another embodiment, the control logic includes circuitry or is coupled to circuitry that automatically corrects faulty output values.

Figure 2:
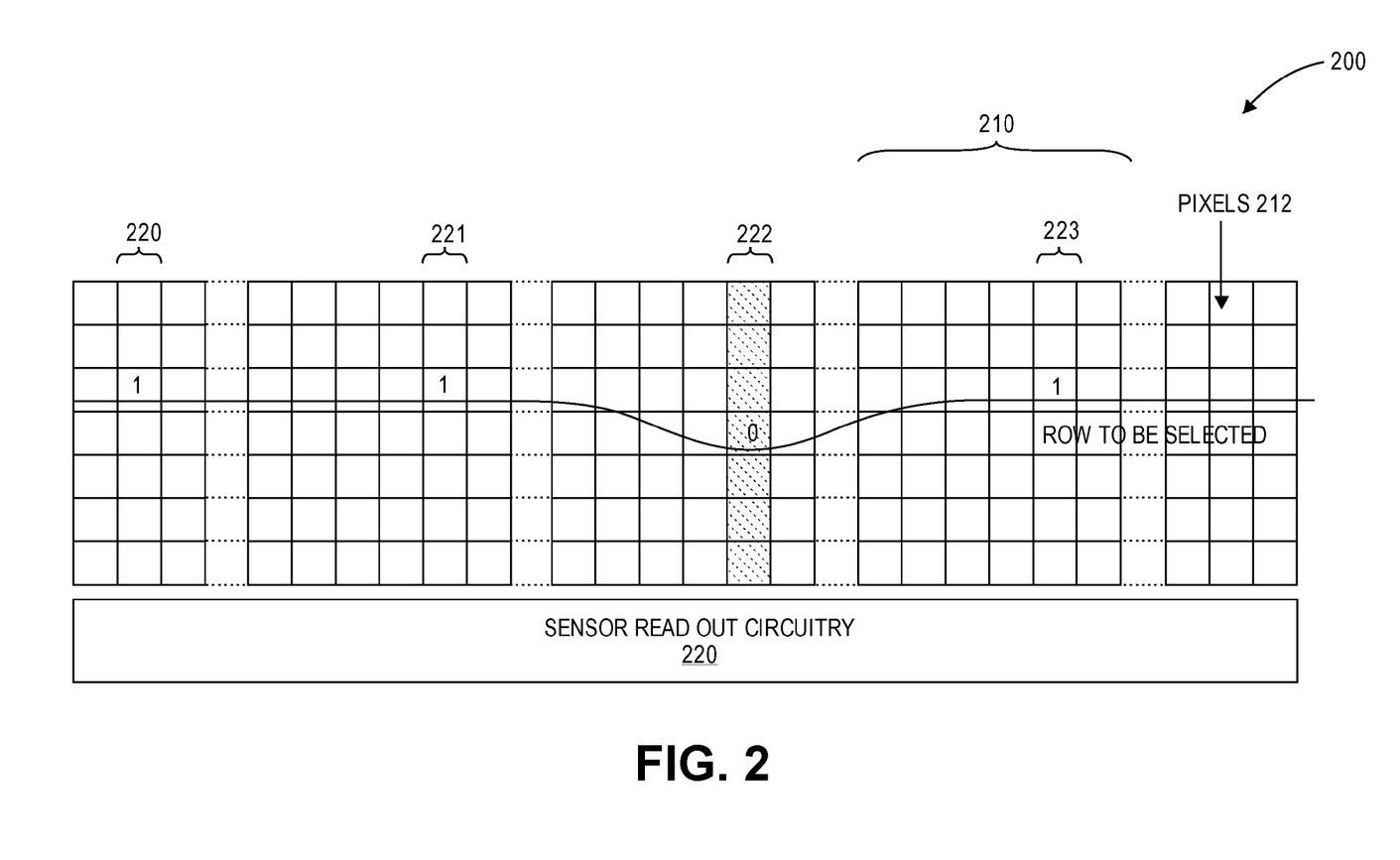
FIG. 2 shows a block diagram of an embodiment of a section of an image sensor having control logic.

FIG. 2 shows a block diagram of an embodiment of a section of an image sensor having control logic. The section of an image sensor 200 includes pixel blocks 210 repeated multiple times with each pixel block having an array of pixels 212. The vertical columns of control logic 220-223 outputs output values (e.g., 1, 1, 0, and 1) corresponding to pixels to be selected and then read out by the sensor read out circuitry 220. In an embodiment, one column of control logic is embedded in each pixel block in a stitched pattern.

In one embodiment, the zero value found in control logic 222 may be a faulty output value. This faulty output value can be manually or automatically removed by disconnecting the control line associated with the zero value in control logic 222. In an embodiment, the control logic includes buffer logic that can be manually disabled or manually configured in a high impedance tri-state mode for disconnecting control lines associated with faulty output values as described below in conjunction with FIG. 4. In another embodiment, the control logic includes a fault detection circuit that automatically corrects faulty output values as described below in conjunction with FIG. 6.

Figure 3:
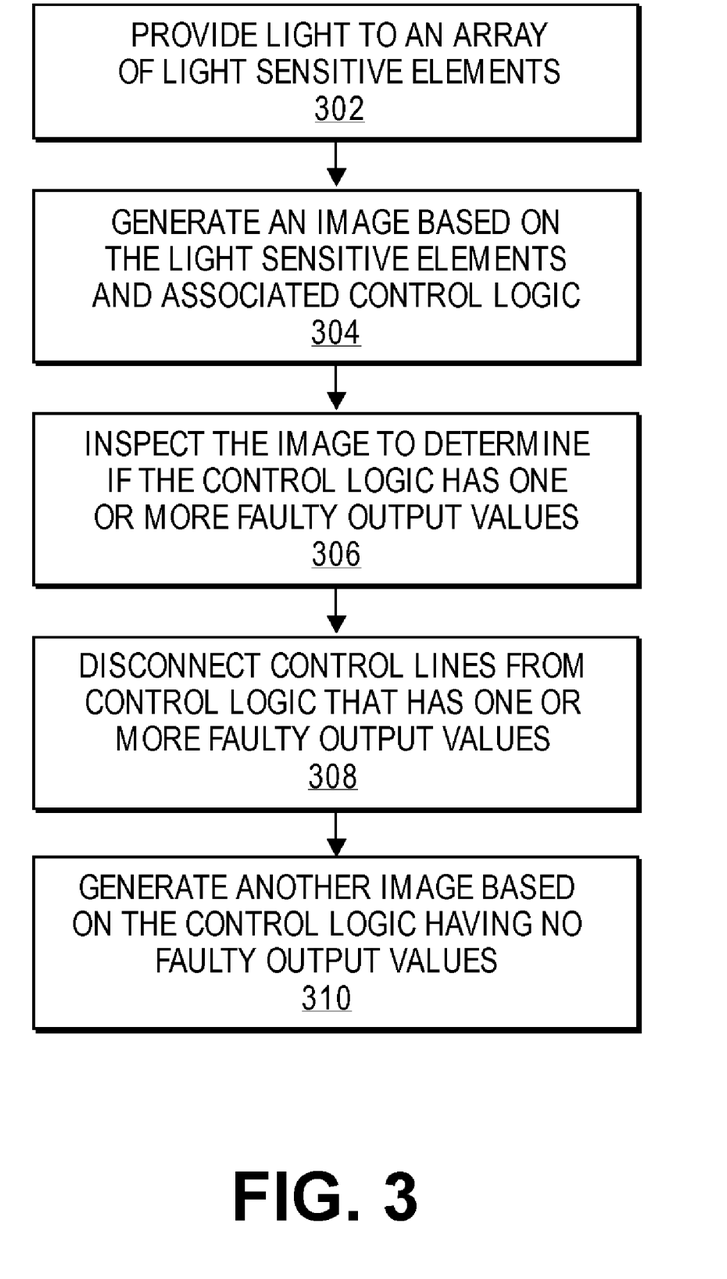
FIG. 3 shows a manual method that may improve yield of an image sensor in accordance with one embodiment.

FIG. 3 shows a manual method that may improve yield of an image sensor in accordance with one embodiment. The method includes providing light to an array of light sensitive elements at block 302. The method further may include generating an image based on the array of light sensitive elements and associated control logic at block 304. The method further may include inspecting the image to determine if the control logic has one or more faulty output values at block 306. The method further may include disconnecting control lines from control logic that has one or more faulty output values at block 308. The method further may include generating another image based on the control logic having no faulty output values at block 310.

In one embodiment, the control logic is coupled to tri-state buffer logic, which is coupled to the control lines. The tri-state buffer logic associated with control logic having one or more faulty output values is configured in a high impedance tri-state mode in order to disconnect one or more control lines from control logic having one or more faulty output values. The one or more disconnected control lines can be controlled with neighboring control logic (e.g., a neighboring column of control logic having no faulty output values). Thus, the tri-state buffer logic adds redundancy to the control logic that may improve yield in image sensors.

The tri-state buffer logic can be manually configured in a high impedance tri-state mode based on inspection of an image having faulty output values. Alternatively, the tri-state buffer logic can be automatically configured in a high impedance tri-state mode based on a software program. The software program may determine that faulty output values exist by analyzing the image. The software program can then automatically configure the tri-state buffer logic associated with the faulty output values of the control logic. The control logic may include shift registers, flip-flops, and/or address decoders.

Figure 4:
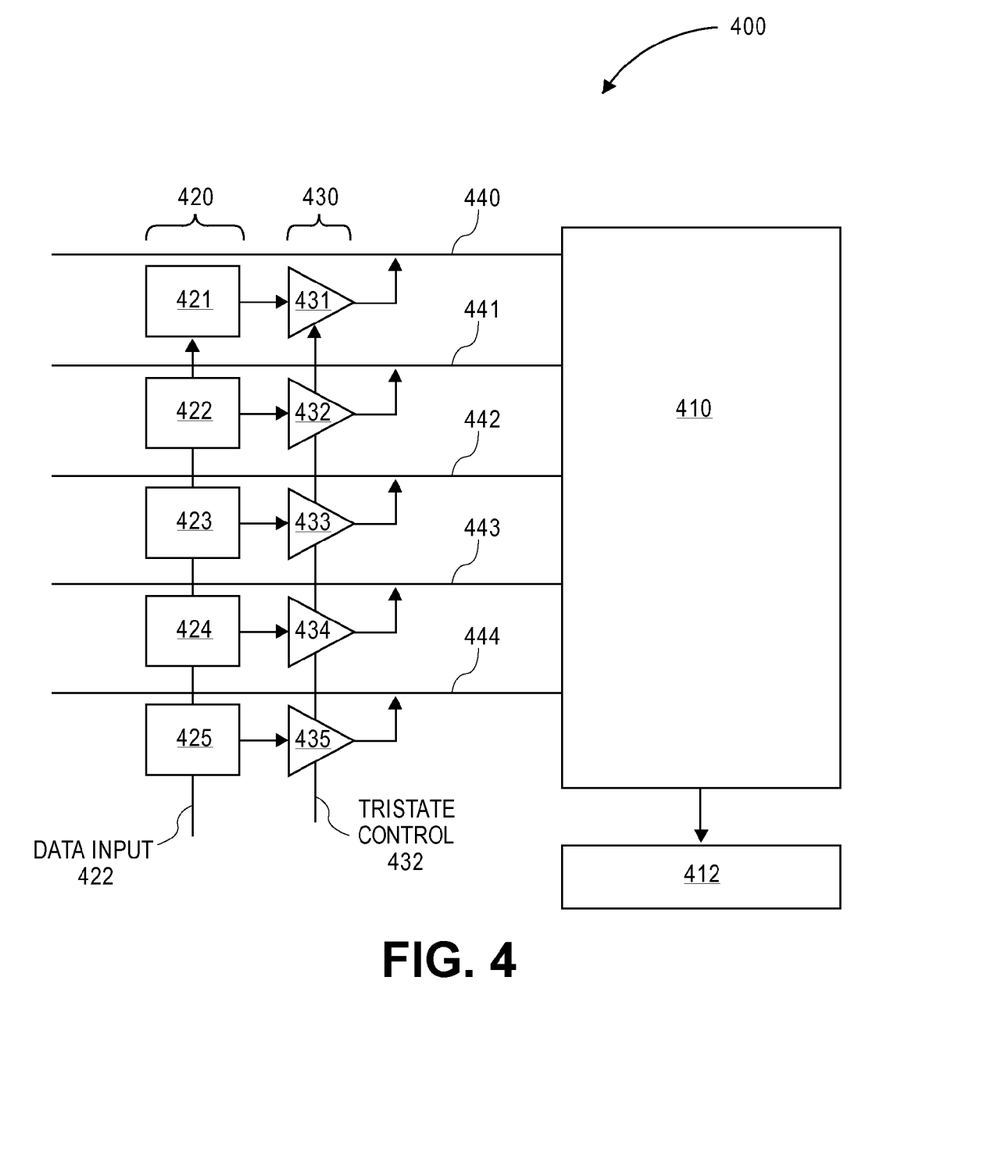
FIG. 4 shows a block diagram of an embodiment of a section of an image sensor having control logic coupled to buffer logic.

FIG. 4 shows a block diagram of an embodiment of a section of an image sensor having control logic coupled to buffer logic. The section 400 is repeated numerous times to form the image sensor 100. In one embodiment, the section 400 includes pixel block 410 having an array of light sensitive elements. The pixel block 410 is coupled to read out circuitry 412 and control lines 440-444. Control logic 420 (e.g., shift register, flip-flop, and address decoder) represents one column of control logic in the image sensor. The control logic is coupled to control lines (e.g., reset signals, select lines, level shift signals, status signals, etc.) The control logic 420 receives data input 422 for selecting control lines 440-444. Each block 421-425 of control logic 420 is coupled to one of the buffers 431-435 of tri-state buffer logic 430. Each buffer is coupled to one of the control lines 440-444. The one or more buffers 431-435 of the tri-state buffer logic associated with blocks 421-425 having faulty output values are configured in a high impedance tri-state mode in order to disconnect control lines from control logic having faulty output values.

In one embodiment, the control logic 420 has one or more faulty output values. The control lines 440, which may be select lines, are configured to manually disconnect from one or more blocks 421-425 of the control logic 422 having one or more faulty output values based on viewing an image of the image sensor and manually configuring the buffers in a tri-state mode. For example, a user can manually place buffer 433 in a high impedance tri-state mode if block 423 has a faulty output value. The control line 442 will be disconnected from block 423. A neighboring parallel column of blocks having no faulty output values can take over control of the control line 442. Thus, redundancy has been added to the control logic.

In another embodiment, the control lines are automatically configured to disconnect from one or more sections of the control logic having one or more faulty output values based on a software program determining whether one or more faulty output values exist. For example, the software program may determine that certain blocks of the control logic have faulty output values by comparing the image with a threshold value and then automatically place buffers that are associated with these blocks in a tri-state mode.

Figure 5:
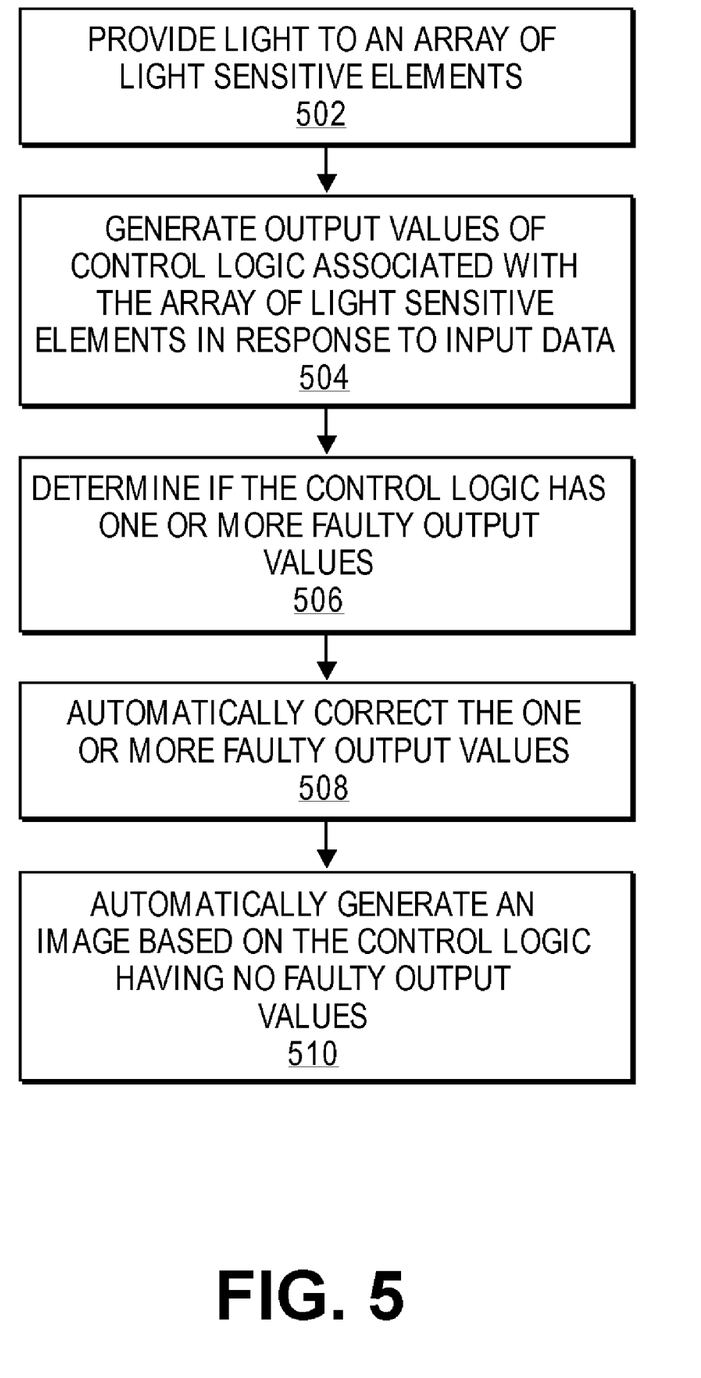
FIG. 5 shows an automatic method that may improve yield of an image sensor in accordance with one embodiment.

FIG. 5 shows a method that may improve yield of an image sensor in accordance with one embodiment. The method optionally includes providing light to an array of light sensitive elements at block 502. The method further may include generating output values of control logic in response to input data at block 504. The control logic is associated with the array of light sensitive elements. The method further may include determining if the control logic has one or more faulty output values at block 506. The method further may include automatically correcting the one or more faulty output values at block 508. The method further may include automatically generating an image based on the control logic having no faulty output values at block 510.

In one embodiment, the control logic is coupled to a fault detection circuit (e.g., majority voting circuit). The majority voting circuit determines if the control logic has one or more faulty output values by comparing each output value to one or more neighbor output values. For another embodiment, the majority voting circuit determines if the control logic has one or more faulty output values by comparing an output value i to output values i+1 and i−1 with i being an integer number.

Figure 6:
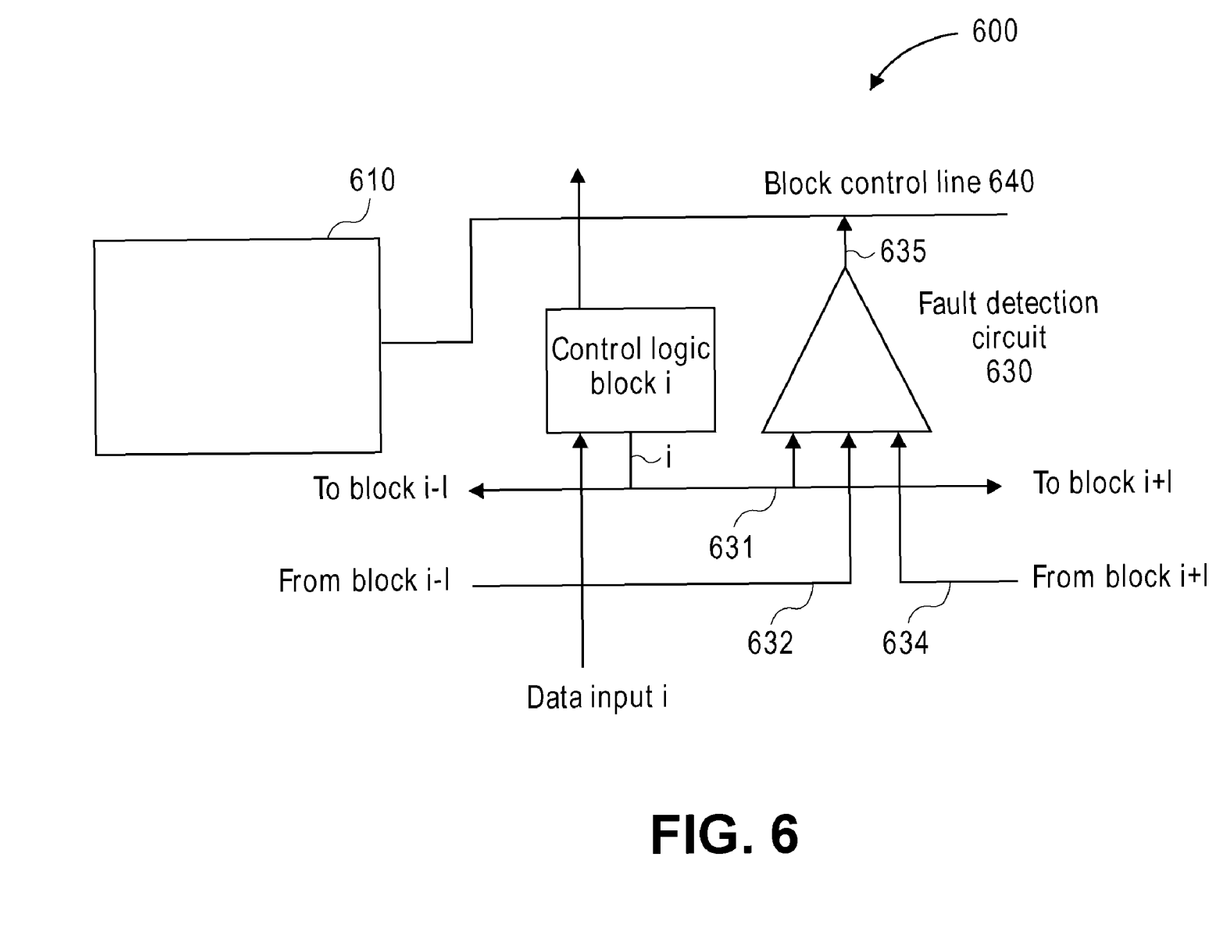
FIG. 6 shows a block diagram of an embodiment of a section of an image sensor having control logic with a fault detection circuit.

FIG. 6 shows a block diagram of an embodiment of a section of an image sensor having a fault detection circuit. In one embodiment, the section 600 is repeated numerous times in combination with pixel blocks to form the image sensor 100. The pixel block 610 includes an array of light sensitive elements. The pixel block 610 is coupled to block control line 640, which can be a row or column select line. Additional block control lines from other sections are also coupled to the pixel block 610 for selecting pixels to be read out from the pixel block 610. The control logic block i, with i being an integer, generates output values i in response to receiving data input signal i. A fault detection circuit 630 is coupled to the control logic blocks i, i+1, and i−1 to automatically determine if the control logic blocks have one or more faulty output values. The fault detection circuit 630 automatically corrects the one or more faulty output values of the control logic block and generates corrected output values 635.

In one embodiment, the block control line 640 receives the corrected output values 635 from the fault detection circuit 630. The corrected output values are used to generate an image with substantially no faulty values. The fault detection circuit 630 determines if the control logic has one or more faulty output values by comparing each output value to one or more neighbor output values.

In certain embodiments, the fault detection circuit 630 is a majority voting circuit. The majority voting circuit determines if the control logic has one or more faulty output values by comparing an output value i received from control logic block i to output values i+1 and i−1 received from control logic blocks i+1 and i−1, respectively. The majority output value for the three logic blocks is determined to be the correct output value for logic block i.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

While some specific embodiments of the disclosure have been shown the disclosure is not to be limited to these embodiments. The disclosure is to be understood as not limited by the specific embodiments described herein.

What is claimed is:

1. A method to improve yield of an image sensor, the method comprising:
    selecting a pixel block from a plurality of pixel blocks of the image sensor, wherein each of the plurality of pixel blocks of the image sensor is associated with a control logic and a majority voting circuit;
    generating output values of the control logic associated with the selected pixel block having an array of light sensitive elements in response to input data;
    determining if the control logic has one or more faulty output values by the majority voting circuit associated with the selected pixel block, wherein the majority voting circuit is coupled with the control logic associated with the selected pixel block and neighboring control logics associated with neighboring pixel blocks of the selected pixel block; and
    automatically correcting the one or more faulty output values.

2. The method of claim 1, further comprising:
    providing light to the array of light sensitive elements of the selected pixel block.

3. The method of claim 2, further comprising:
    automatically generating an image based on the control logic having no faulty output values.

4. The method of claim 1, wherein the majority voting circuit determines if the control logic has one or more faulty output values by comparing each output value generated by the control logic to one or more neighbor output values generated by the neighboring control logics.

5. The method of claim 4, wherein the majority voting circuit determines if the control logic has one or more faulty output values by comparing an output value i to output values i+1 and i−1 with i being an integer number.

6. An image sensor, comprising:
    a plurality of sections, wherein each section of the plurality of sections comprising:
        a pixel block having an array of light sensitive elements;
        a control logic coupled to the array of light sensitive elements of the pixel block, wherein the control logic is configured to generate output values in response to input data; and
        a fault detection circuit coupled to the control logic and neighboring control logics of neighboring pixel blocks of the pixel block to automatically determine if the control logic has one or more faulty output values, wherein the fault detection circuit is configured to automatically correct the one or more faulty output values and to generate corrected output values.

7. The image sensor of claim 6, further comprising:
    control lines to receive the corrected output values from the fault detection circuit.

8. The image sensor of claim 7, wherein the corrected output values are used to select the light sensitive elements.

9. The image sensor of claim 6, wherein the control logic comprises at least one of shift registers, flip-flops, and address decoders.

10. The image sensor of claim 6, wherein the fault detection circuit determines if the control logic has one or more faulty output values by comparing each output value generated by the control logic to one or more neighbor output values generated by the neighboring control logics.

11. The image sensor of claim 6, wherein the fault detection circuit comprises a majority voting circuit.

12. The image sensor of claim 11, wherein the majority voting circuit determines if the control logic has one or more faulty output values by comparing an output value i received from control logic i to output values i+1 and i−1 received from control logic i+1 and i−1, respectively, with i being an integer number.

13. The image sensor of claim 6, wherein the light sensitive elements are passive or active pixels sensors.

14. The image sensor of claim 6, wherein the control logic is embedded in the array of light sensitive elements in a stitched pattern.

15. The image sensor of claim 6, further comprising:
    read out circuitry coupled to the array of light sensitive elements, the read out circuitry to read out pixel values for the image sensor.

16. An apparatus to automatically improve yield of an image sensor, comprising:
    means for selecting a pixel block from a plurality of pixel blocks of the image sensor, wherein each of the plurality of pixel blocks of the image sensor is associated with a control logic and a majority voting circuit;
    means for generating output values of the control logic associated with the selected pixel block having an array of light sensitive elements in response to input data;
    means for determining if the control logic has one or more faulty output values by the majority voting circuit associated with the selected pixel block, wherein the majority voting circuit is coupled with the control logic associated with the selected pixel block and neighboring control logics associated with neighboring pixel blocks of the selected pixel block; and
    means for automatically correcting one or more faulty output values.

17. The apparatus of claim 16, further comprising:
    means for providing light to the array of light sensitive elements of the selected pixel block;
    means for automatically generating an image based on the control logic having no faulty output values.

18. The apparatus of claim 16, further comprising a fault detection circuit to determine if the control logic has the one or more faulty output values by comparing each output value to one or more neighbor output values.

* * * * *